US012788536B2

(12) United States Patent
Aravena

(10) Patent No.: US 12,788,536 B2
(45) Date of Patent: Nov. 10, 2026

(54) CONVEX INTERFACE FOR DENTAL PROSTHETIC APPLICATIONS

(71) Applicant: Young Innovations, Inc., Algonquin, IL (US)

(72) Inventor: Ines M. Aravena, Santa Rosa Valley, CA (US)

(73) Assignee: Young Innovations, Inc., Algonquin, IL (US)

( * ) Notice: Subject to any disclaimer, the term of this patent is extended or adjusted under 35 U.S.C. 154(b) by 753 days.

(21) Appl. No.: 18/151,427

(22) Filed: Jan. 7, 2023

(65) Prior Publication Data

US 2023/0240813 A1 Aug. 3, 2023

Related U.S. Application Data

(60) Provisional application No. 63/305,571, filed on Feb. 1, 2022.

(51) Int. Cl.
*A61C 8/00* (2006.01)

(52) U.S. Cl.
CPC .......... *A61C 8/0053* (2013.01); *A61C 8/0068* (2013.01); *A61C 8/0074* (2013.01); *A61C 8/0077* (2013.01); *A61C 8/0095* (2013.01)

(58) Field of Classification Search
CPC ... A61C 8/0053; A61C 8/0068; A61C 8/0074; A61C 8/0077; A61C 8/0095; A61C 8/00; A61C 8/0066; A61C 8/0012; A61C 8/005; A61C 8/0048; A61C 8/0028
USPC ....................................... 433/173–176, 201.1
See application file for complete search history.

(56) References Cited

U.S. PATENT DOCUMENTS

| | | | |
|---|---|---|---|
| 4,832,601 | A | 5/1989 | Linden |
| 6,244,867 | B1 | 6/2001 | Aravena et al. |
| 6,951,462 | B2 | 10/2005 | Kumar et al. |
| 6,986,660 | B2 | 1/2006 | Kumar et al. |
| 7,021,934 | B2 | 4/2006 | Aravena et al. |
| 7,066,736 | B2 | 6/2006 | Kumar et al. |
| 7,291,013 | B2 | 11/2007 | Aravena et al. |
| 7,300,283 | B2 | 11/2007 | Aravena et al. |
| D752,753 | S | 3/2016 | Aravena et al. |
| D752,754 | S | 3/2016 | Aravena et al. |
| D752,755 | S | 3/2016 | Aravena et al. |
| D752,756 | S | 3/2016 | Aravena et al. |

(Continued)

FOREIGN PATENT DOCUMENTS

| | | | |
|---|---|---|---|
| EP | 2684538 | A1 | 1/2014 |
| JP | 2010538706 | A | 12/2010 |

(Continued)

OTHER PUBLICATIONS

Linden Harry, Adjustable Support for an Artificial Tooth and Method for Adjusting, DE-3829576-A1, Machine translation (Year: 1989).*

(Continued)

*Primary Examiner* — Eric J Rosen
*Assistant Examiner* — Mirayda A Aponte
(74) *Attorney, Agent, or Firm* — McDermott Will & Schulte LLP

(57) ABSTRACT

An interface for a dental system enables precise clinical placement of the implant or the root post while allowing axial adjustment of the abutment interface for an optimal prosthetic interface requirement.

17 Claims, 17 Drawing Sheets

(56) References Cited

U.S. PATENT DOCUMENTS

| | | | | |
|---|---|---|---|---|
| 9,697,748 | B1 | 7/2017 | Niznick et al. | |
| 10,307,225 | B2 | 6/2019 | Aravena et al. | |
| 11,484,392 | B2 | 11/2022 | Aravena | |
| 11,559,376 | B2 | 1/2023 | Aravena | |
| 2003/0221977 | A1 | 12/2003 | Kumar et al. | |
| 2005/0266379 | A1 | 12/2005 | Kumar et al. | |
| 2015/0230892 | A1* | 8/2015 | Seavey | A61C 8/0054 433/173 |
| 2017/0105820 | A1 | 4/2017 | Aravena | |
| 2017/0165035 | A1 | 6/2017 | Niznick et al. | |
| 2018/0092720 | A1 | 4/2018 | Aravena et al. | |
| 2018/0280123 | A1 | 10/2018 | Aravena | |
| 2019/0254785 | A1 | 8/2019 | Stumpel | |

FOREIGN PATENT DOCUMENTS

| | | | | |
|---|---|---|---|---|
| KR | 2020210002667 U | 12/2021 | | |
| WO | WO-9203984 A1 * | 3/1992 | | A61C 8/0068 |

OTHER PUBLICATIONS

Cendres et al., Arrangement for forming a bridge construction and fixation screw therefor, DE-212007000106-U1, Machine translation (Year: 2010).*

Seavey Bruce, Dental Device for Anchoring a Denture to an Implant, KR-20150097423-A, Machine translation (Year: 2015).*

International Search Report and the Written Opinion of patent application No. PCT/US2023/061386, dated May 19, 2023, 14 pages.

Partial Supplementary European Search Report of European Patent Application No. 23750317.2, mailed Dec. 23, 2025.

* cited by examiner

CONVEX INTERFACE FOR DENTAL PROSTHETIC APPLICATIONS

RELATED APPLICATION

This application claims the benefit under 35 U.S.C. § 119(e) of U.S. Provisional Application No. 63/305,571, filed Feb. 1, 2022, entitled "Convex Interface for Dental Prosthetic Applications," which is hereby incorporated by reference in its entirety.

FIELD OF THE INVENTION

The present invention is in the field of dentistry, and, more particularly, is in the field of prosthetic dentistry.

BACKGROUND OF THE INVENTION

One of the clinical limitations for the construction of a prosthesis to restore masticatory function is the axial angulation of the implant or the tooth root in relation to the main axis of the prosthetic supporting attachments. Several methods exist in the marketplace to correct the discrepancy between the two axes, such as rotating overdenture attachments and pre-angled abutments.

Overdenture attachments that have the capability to rotate typically have flexible liners that required maintenance and replacement as the liners tend to wear out over time. Pre-angled abutments have preestablished angles that may not precisely align to the desired axis of the prosthetic attachment. In several cases, users may place the dental implant at a non-optimal clinical angle to compensate for the requirements of the prosthetic application. In addition, the root of the tooth where a post is placed/cemented may not have the adequate angulation to work with the available attachments. All these methods have limitations and a need exists for an interface that enables the precise angulation of the abutment independent of the axis of the implant or the root.

SUMMARY OF THE INVENTION

The embodiments disclosed herein provide an interface that enables precise clinical placement of the implant or the root post while allowing axial adjustment of the abutment interface for an optimal prosthetic interface requirement.

The dental system comprises a lower component having a coronal region with a concave, bevel, or conical interface. The dental system further comprises an upper component having an apical region with a corresponding convex interface and an inner cavity with a concave, bevel, or conical surface. The lower component and the upper component are fixed together via a screw with a circular or convex outer surface that seats on the concave, bevel or conical surface of the upper component and remains aligned to the axis of the lower component. The upper component is rotatable around an axis of the lower component and pivotable at an angle with respect to the axis.

In certain embodiments, the lower component comprises an implant.

In certain embodiments, the lower component comprises a root post.

In certain embodiments, the lower component comprises an implant-engaging abutment.

In certain embodiments, the lower component comprises an abutment having threads for engaging an implant.

In certain embodiments, the upper component comprises coronal features to support removable overdentures.

In certain embodiments, the upper component comprises coronal features to support fixed-retained overdentures.

In certain embodiments, the upper component comprises upper features to support single-unit prosthesis.

In certain embodiments, the upper component has a margin to support prosthetic components.

In certain embodiments, the upper component has no margin and has a coronal feature to frictionally retain or snap-on retain a prosthetic component.

In certain embodiments, the lower component has a margin to support prosthetic components.

In certain embodiments, the lower component has a scallop, contour, or natural margin.

In certain embodiments, the lower and upper components support conventional and digital prosthetic fabrication workflows.

In certain embodiments, the upper component has internal threads to engage a prosthetic supporting component.

In certain embodiments, the upper component has coronal features that are off-axis to the axis of the convex interface.

In certain embodiments, the upper component has coronal features having the same axis as the axis of the convex interface.

In certain embodiments, the lower component and the upper component are fixed together via a screw with a circular or convex outer surface that seats on the concave, bevel or conical surface of the upper component and engages the threads of an implant.

In certain embodiments, the lower component and the upper component are fixed together via a screw with a circular or convex outer surface that seats on the concave, bevel or conical surface of the upper component and engages the threads of the lower component.

Another aspect of the present disclosure is a paralleling dental system comprising cylinders to connect to coronal prosthetic interface features of abutments having a shaft aligned to the axis of the abutments' prosthetic interface. The paralleling dental system also comprises a bracket that engages the shaft of the cylinders to connect them together.

In certain embodiments, the cylinder includes an inner cavity that enables a tool to engage the screw and an outer diameter to slide over a tube having flat surfaces perpendicular to the main axis of the cylinder. The bracket seats on the flat surfaces to connect, capture, and align the multi-unit dental system.

In certain embodiments, the cylinder includes an inner cavity that enables a tool to engage the screw and an outer diameter to slide over a ring having a side hole to receive a screw. The bracket holds the screw to connect, capture, and align the position of the multi-unit dental system.

In certain embodiments, the cylinder includes an inner cavity that enables a tool to engage the screw and an outer diameter to slide over the brackets. The brackets have female and male protrusions with retentive features or screws to lock the brackets in place and connect, capture, and align the position of the multi-unit dental system.

In certain embodiments, the cylinder has outer features to support digital scanning and conventional impression techniques.

Another aspect of the present disclosure is a method for making a dental assembly. The dental assembly includes a lower component having a coronal region with a concave, bevel, or conical interface. The dental assembly further includes an upper component having an apical region with a corresponding convex, interface, and an inner cavity with a concave, bevel, or conical surface. The lower component and the upper component are fixed together via a screw with a circular or convex outer surface that seats on the concave, bevel, or conical surface of the upper component and remains aligned to the axis of the lower component. The upper component is rotatable around an axis of the lower component and pivotable at an angle with respect to the axis. The dental assembly further includes a prosthesis. The method for making the dental assembly comprises designing and fabricating a prosthesis to fit the upper component that is rotatable around an axis of the lower component and pivotable at an angle with respect to the axis. Designing the prosthesis includes designing the drive access channel in approximal alignment with the coronal axis of the upper component such that the driver can engage the screw and drive the screw to attach the assembly to the lower component.

In certain embodiments, after designing the prosthesis, the method further comprises inserting the screw into the upper component and attaching the prosthesis to the upper component.

In certain embodiments, the dental assembly allows for the screw to move axially and place the dental assembly onto the lower component prior to driving the screw into the lower component.

In certain embodiments, the prosthesis is designed and fabricated using the stone model replica of the subject.

In certain embodiments, the prosthesis is designed and fabricated using the scan data of the subject.

In certain embodiments, the coronal axis of the upper component is aligned towards the lingual side of the subject.

Another aspect of the present disclosure is a method for making a multi-unit dental assembly. The dental assembly includes lower components that have a coronal region with a concave, bevel, or conical interface. The dental assembly further includes upper components that have an apical region with corresponding convex interfaces and inner cavities with concave, bevel, or conical surfaces. The lower components and the upper components are fixed together via screws with circular or convex outer surfaces that seat on the concave, bevel, or conical surfaces of the upper components and remain aligned to the axis of the lower components. The upper components are rotatable around the axes of the lower components and pivotable at an angle with respect to the axes. The dental assembly further includes a prosthesis. The method for making a multi-unit dental assembly comprises designing and fabricating a prosthesis to fit the upper components that are rotatable around the axes of the lower components and pivotable at an angle with respect to the axes. Designing the prosthesis includes designing the interfaces of the prosthesis aligned to each other to the coronal axis of the upper components.

In certain embodiments, the prosthesis is designed and fabricated using the stone model replica of the subject.

In certain embodiments, the prosthesis is designed and fabricated using the scan data of the subject.

In certain embodiments, after designing the prosthesis, the method further comprises inserting the screws into the upper components and attaching the assemblies to the lower components by loosely tightening the screws and rotating the upper components until their coronal axes are parallel to each other.

In certain embodiments, the multi-unit dental assembly allows for the prosthesis to fit onto the upper components to verify and correct parallelism between upper components prior to fully tightening the screws into the lower component.

In certain embodiments, the prosthesis is connected to the upper component via a retentive feature or an o-ring.

In certain embodiments, designing the prosthesis includes designing the drive access channel in approximal alignment with the coronal axis of the upper component such that the driver can engage the prosthetic screw and drive the screw to attach the assembly to the upper component.

BRIEF DESCRIPTIONS OF THE DRAWINGS

The foregoing aspects and other aspects of the disclosure are described in detail below in connection with the accompanying drawings in which.

DESCRIPTION OF ILLUSTRATED EMBODIMENTS

Figure 1:
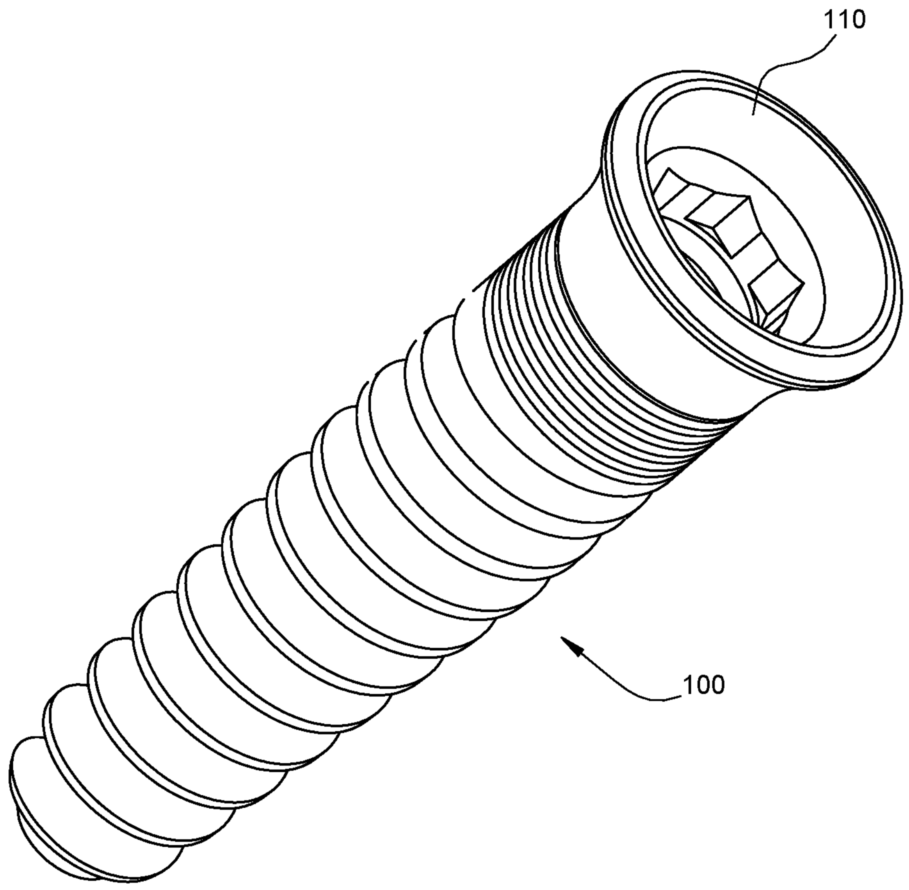
FIG. 1 illustrates an implant.

As used throughout this specification, the words "upper," "lower," "longitudinal," "upward," "downward," "proximal," "distal," and other similar directional words are used with respect to the views being described. It should be understood that the dental system described herein can be used in various orientations and is not limited to use in the orientations illustrated in the drawing figures.

The embodiments disclosed herein provide a dental system that enables precise clinical placement of an implant 100 or a root-post 118 while allowing for the axial adjustment of an abutment interface for an optimal prosthetic interface requirement. The dental system 100 includes a lower component. The lower component includes a coronal region. The coronal region includes a concave, beveled, or conical feature.

In one embodiment, a concave, bevel, or conical feature 110 is located at the coronal aspect of the implant 100 as shown in FIG. 1.

Figure 2:
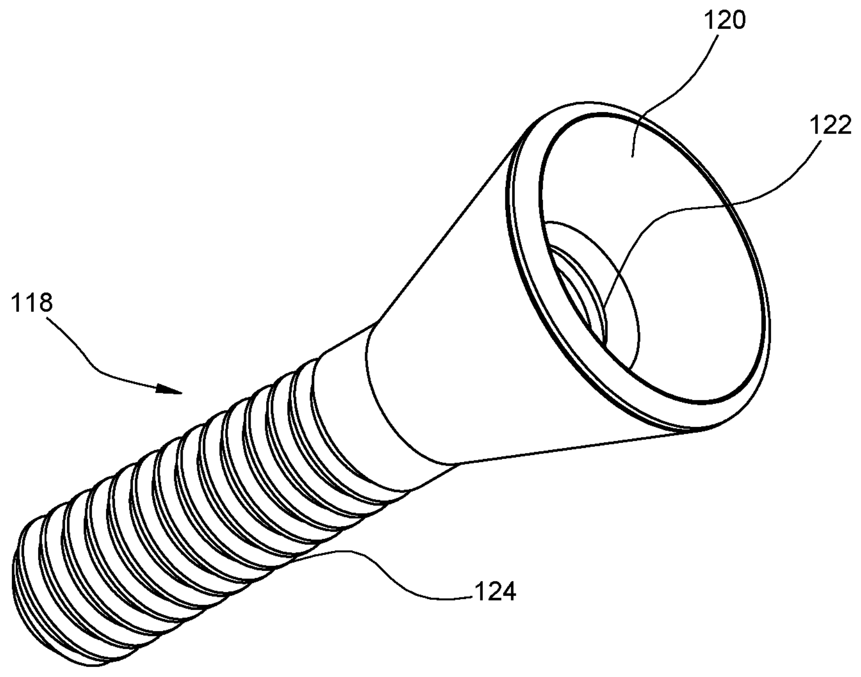
FIG. 2 illustrates a root post.

In another embodiment, a concave, bevel, or a conical feature 120 is located at the coronal aspect of the root post 118 and the root post 118 has inner prosthetic-engaging threads 122 and a root-engaging apical end 124 as shown in FIG. 2.

Figure 3A:
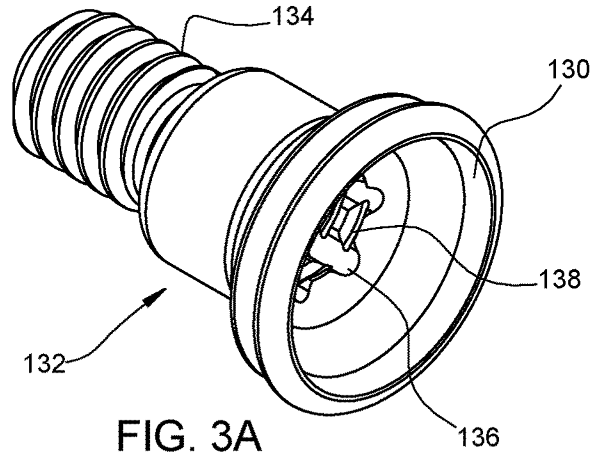
FIGS. 3A, 3B, 3C, 3D and 3E illustrate abutment bases.

In another embodiment, a concave, bevel, or conical feature 130 is located at the coronal aspect of an abutment base 132 and the abutment base 132 has an outer thread-engaging feature 134 at its apical aspect and a tool-engaging feature 136 to drive the abutment base 132 into a corresponding mating dental component as shown in FIG. 3A. The abutment base 132 also may have internal threads 138 to fixate a prosthesis.

Figure 3B:
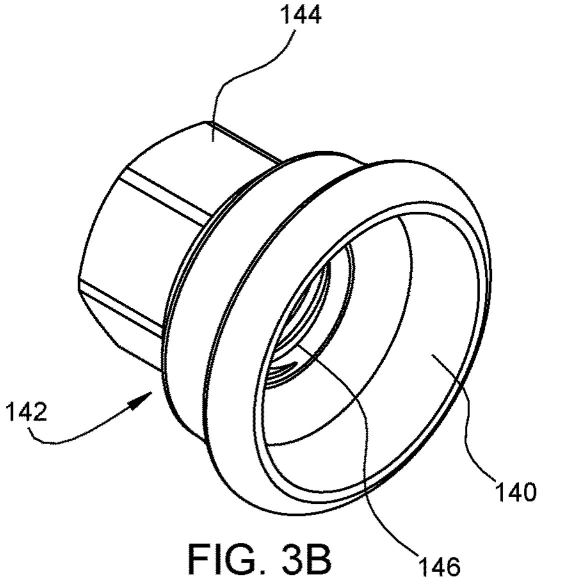

In another embodiment, a concave, bevel, or conical feature 140 is located at the coronal aspect of an abutment base 142 and the abutment base 142 has an external anti-rotational feature 144 at its apical aspect, as shown in FIG. 3B, to engage a corresponding dental implant. The abutment base 142 also may have internal threads 146 to retain a screw or fixate a prosthesis.

Figure 3C:
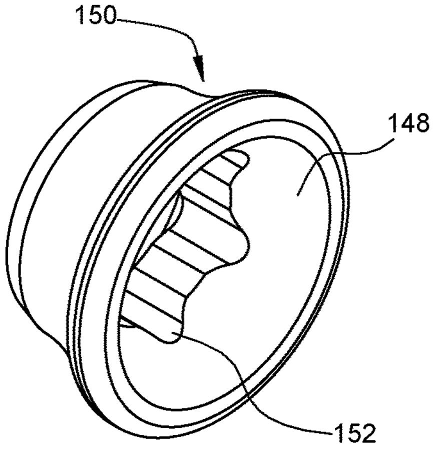

In another embodiment, a concave, bevel, or conical feature 148 is located at the coronal aspect of an abutment base 150 having an internal anti-rotational feature 152 at its apical aspect, as shown in FIG. 3C, to engage a corresponding dental implant.

Figure 3D:
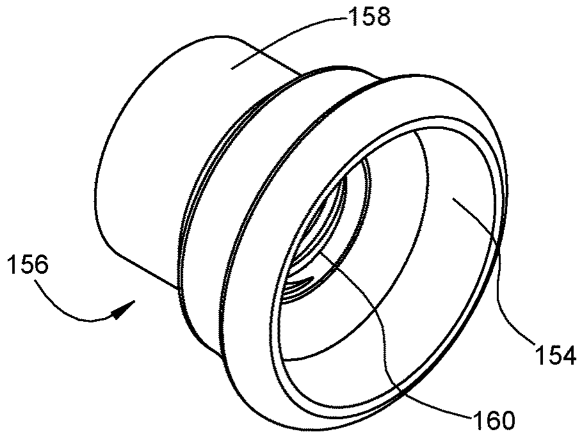

In another embodiment, a concave, bevel, or conical feature 154 is located at the coronal aspect of an abutment base 156 having an external non-engaging anti-rotational feature 158 at its apical aspect and internal threads 160 to retain a screw or fixate a prosthesis as shown in FIG. 3D.

Figure 3E:
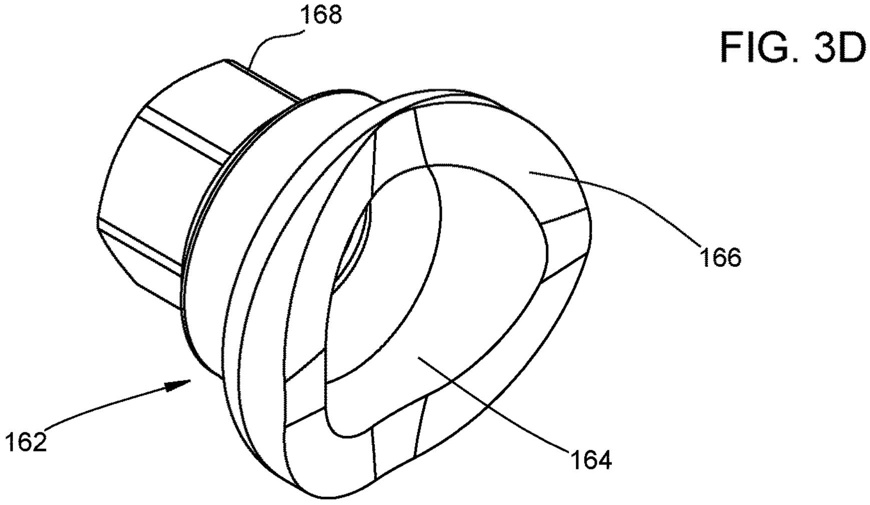

In another embodiment illustrated in FIG. 3E, an abutment base 162 has at its coronal region a concave, bevel, or conical feature 164 and a scallop, contour, or natural prosthetic margin 166 that support conventional and digital restoration workflows. The abutment base 162 also has at its apical aspect an external non-engaging or engaging anti-rotational feature 168.

Figure 4A:
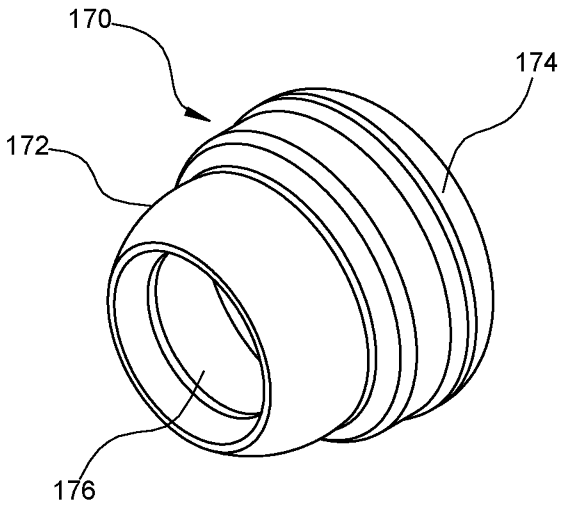
FIGS. 4A, 4B and 4C illustrate abutment tops.

A corresponding convex feature may be located at the apical aspects of an abutment or abutment top having different coronal configurations to support different prosthetic applications. FIG. 4A illustrates an abutment top 170 that includes a convex feature 172. The abutment top 170 includes a coronal region feature 174 for a removable prosthesis and an inner surface 176 to seat a fixation screw.

Figure 4B:
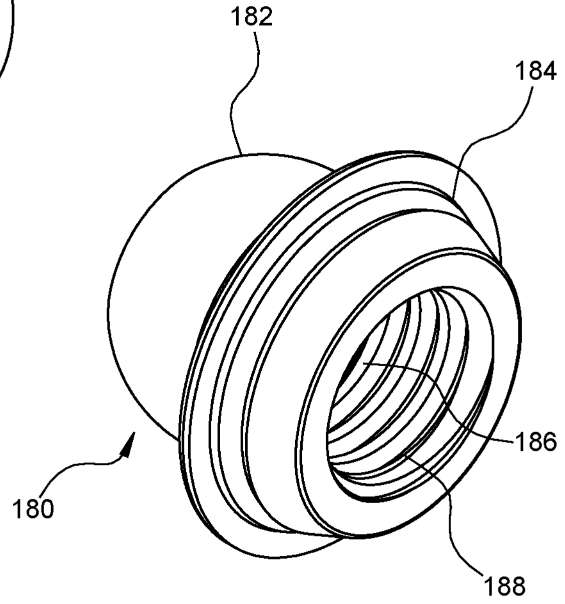

FIG. 4B illustrates an abutment top 180 that includes a convex feature 182. The abutment top 180 includes a coronal region feature 184 for a screw-retained prosthesis, an inner surface 186 to seat a fixation screw, and inner threads 188 to receive a prosthetic retaining screw.

Figure 4C:
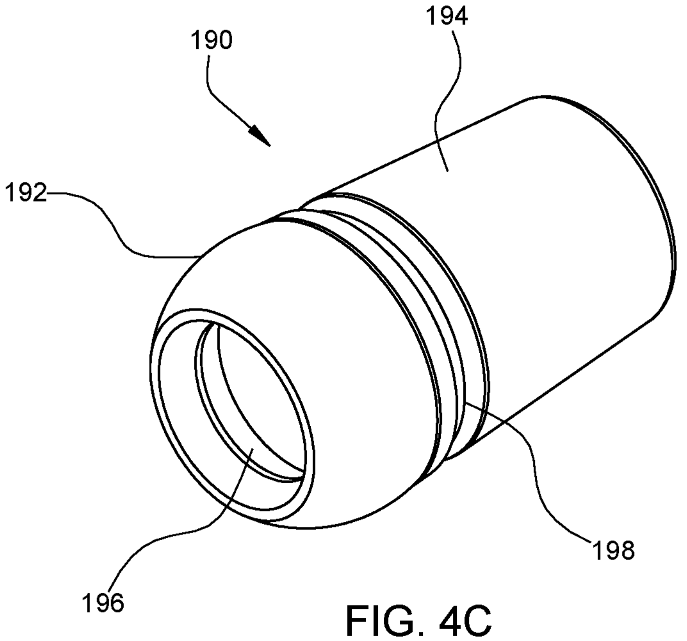

FIG. 4C illustrates an abutment top 190 that includes a convex feature 192. The abutment top 190 includes a coronal region feature 194 for a friction-fitted or cement-retained prosthesis, an inner surface 196 to seat a fixation screw, and an optional groove 198 to snap-on supporting components and temporary prostheses.

Figure 5A:
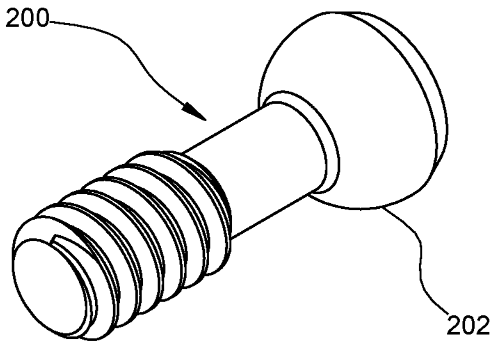
FIG. 5A illustrates a fixation screw.

The abutment tops of FIGS. 4A, 4B, and 4C are fixed to the implant, the root post, or to one of the previously described abutment bases via a fixation screw 200 that has a corresponding convex (circular) feature 202 at its coronal region as shown in FIG. 5A.

Figure 5B:
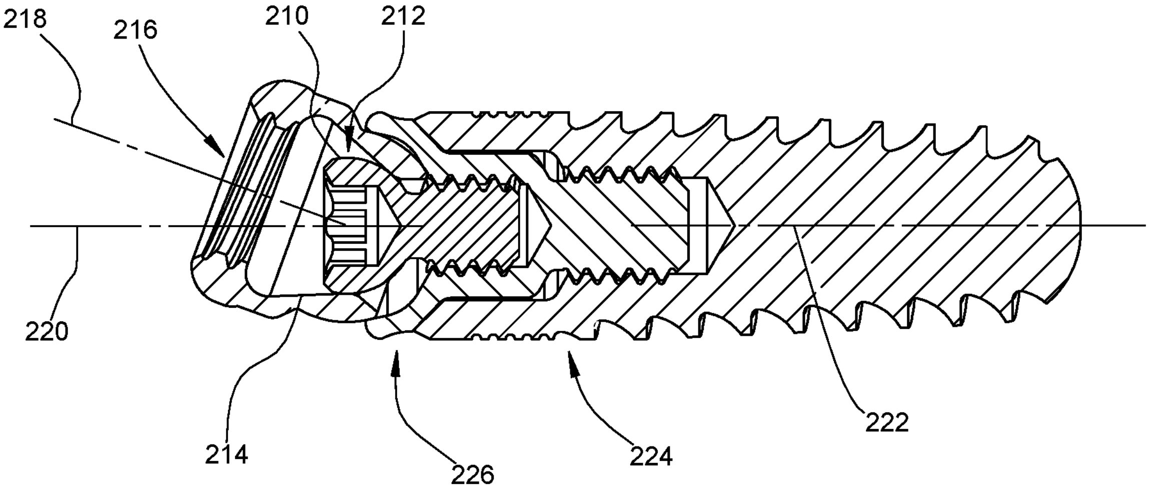
FIG. 5B illustrates a fixation screw assembled to an abutment top.

As further shown in FIG. 5B, a convex feature 210 of a fixation screw 212 can fully seat on an inner concave or beveled surface 214 of an abutment top 216 having an off-axis 218 while a fixation screw axis 220 can remain aligned to an axis 222 of an implant 224 or an abutment base 226.

Figure 6A:
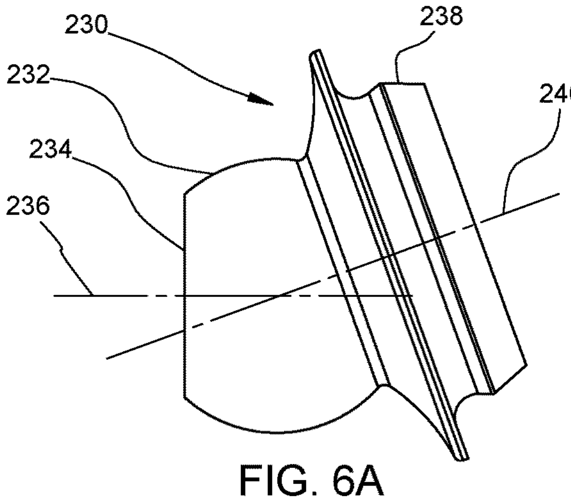
FIGS. 6A, 6B, 6C and 6D illustrate configurations of abutment tops with straight or off-axis connections.

An abutment top can have a multitude of different configurations at its coronal region, and it can have straight or off-axis connections to accommodate for any type of prosthetic applications. In one embodiment, an abutment top 230 includes a convex feature 232 with a face 234 that is perpendicular to an axis 236 and has a coronal region with a screw-retained prosthetic feature 238 with an axis 240 that is off-axis to the axis 236 as shown in FIG. 6A.

Figure 6B:
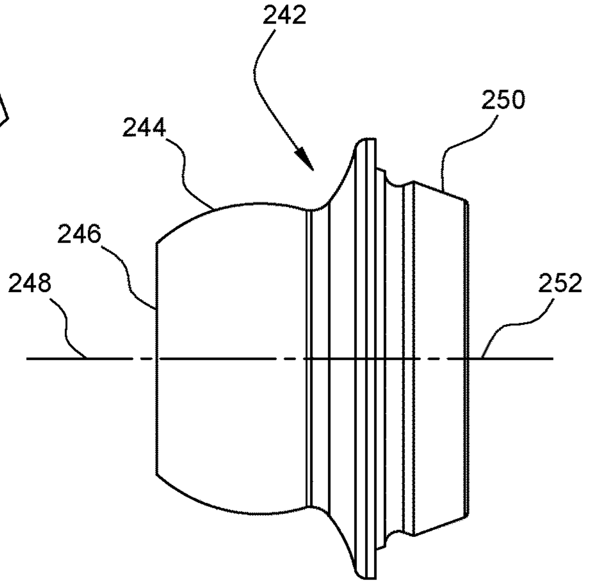

In another embodiment, an abutment top 242 includes a convex feature 244 with a face 246 that is perpendicular to an axis 248 and has a coronal region with a screw-retained prosthetic feature 250 with an axis 252 that is aligned to the axis 248 as shown in FIG. 6B.

Figure 6C:
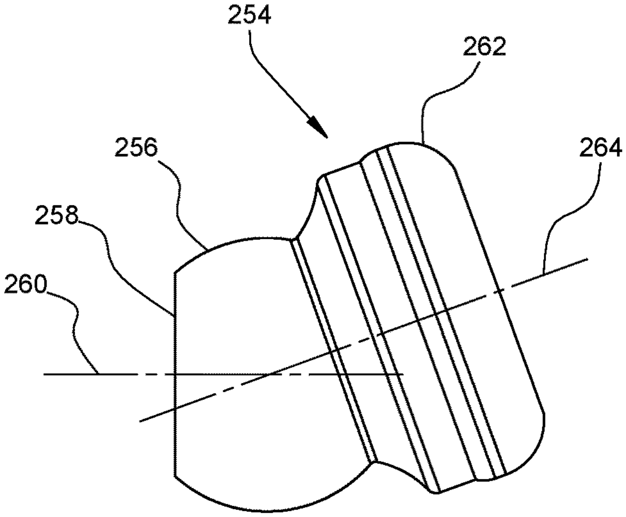

In another embodiment, an abutment top 254 includes a convex feature 256 with a face 258 that is perpendicular to an axis 260 and has a coronal region with a removable prosthetic feature 262 with an axis 264 that is off-axis to the axis 260 as shown in FIG. 6C.

Figure 6D:
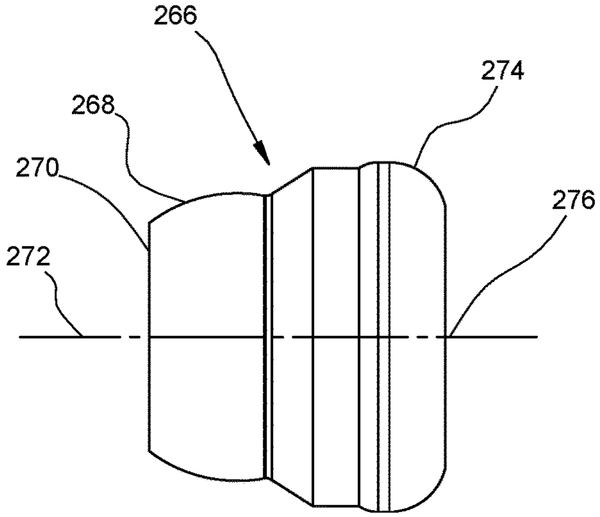

In another embodiment, an abutment top 266 includes a convex feature 268 with a face 270 that is perpendicular to an axis 272 and has a coronal region with a removable prosthetic feature 274 with an axis 276 that is aligned to the axis 272 as shown in FIG. 6D.

Figure 7:
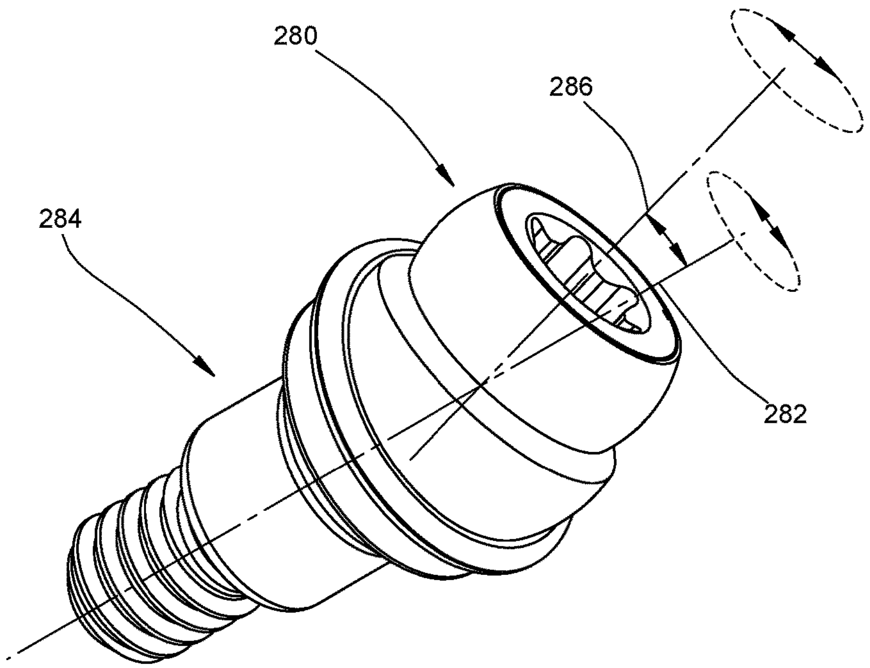
FIG. 7 illustrates a rotatable and pivotable abutment top.

As illustrated in FIG. 7, an abutment top 280 can rotate 360 degrees around a main axis 282 of an implant or an abutment base 284 and can also tilt from a zero angle to an off-axis angle 286 with respect to a main axis 282 of the implant or the abutment base 284.

Figure 8:
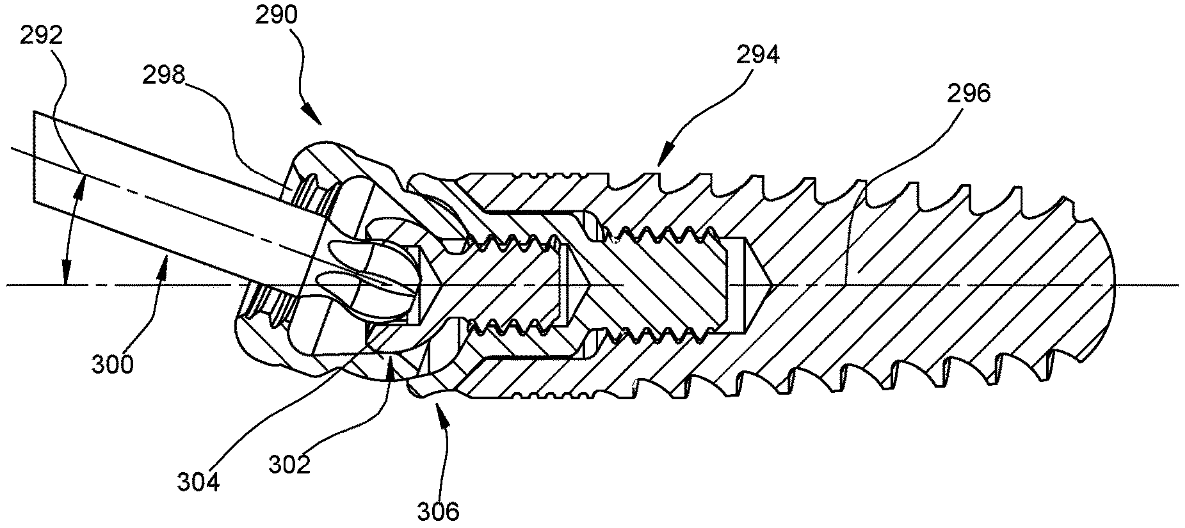
FIG. 8 illustrates the engagement of the fixation screw of the abutment top with a driver.

FIG. 8 illustrates the position of an abutment top 290 at an off-axis angle 292 from an implant's 294 main axis 296. The abutment top 290 has a coronal cavity 298 that enables a driver 300 to access a fixation screw 302 at an angle to engage a driving feature 304 to insert or remove the abutment top 290 from a mating component, such as an abutment base 306.

Figure 9A:
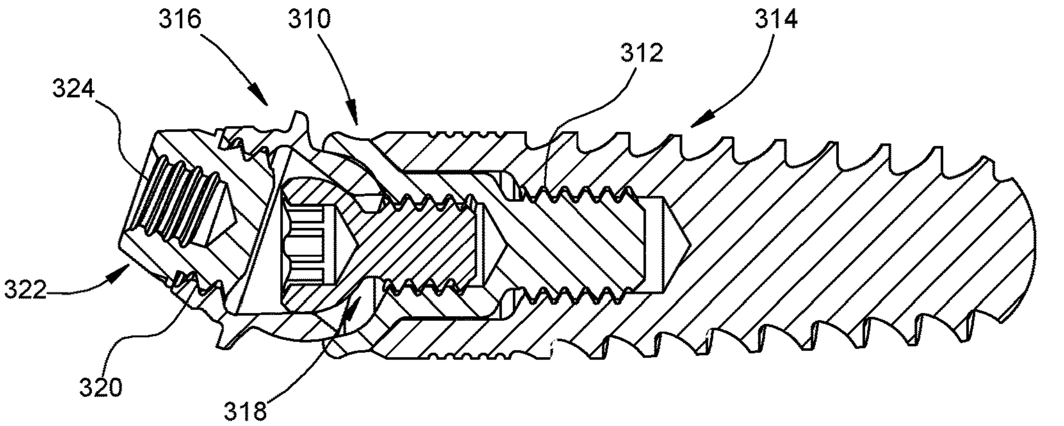
FIGS. 9A, 9B, 9C and 9D illustrate engagements of abutment bases with implants.

In the embodiment illustrated in FIG. 9A, an abutment base 310 engages a thread 312 of an implant 314 and an abutment top 316 is fixed into the abutment base 310 via a fixation screw 318. In certain embodiments, the abutment top 316 includes inner threads 320 to engage supporting components, such as a cover screw or an extension piece 322. The extension piece 322 has smaller inner threads 324 to work with supportive components.

Figure 9B:
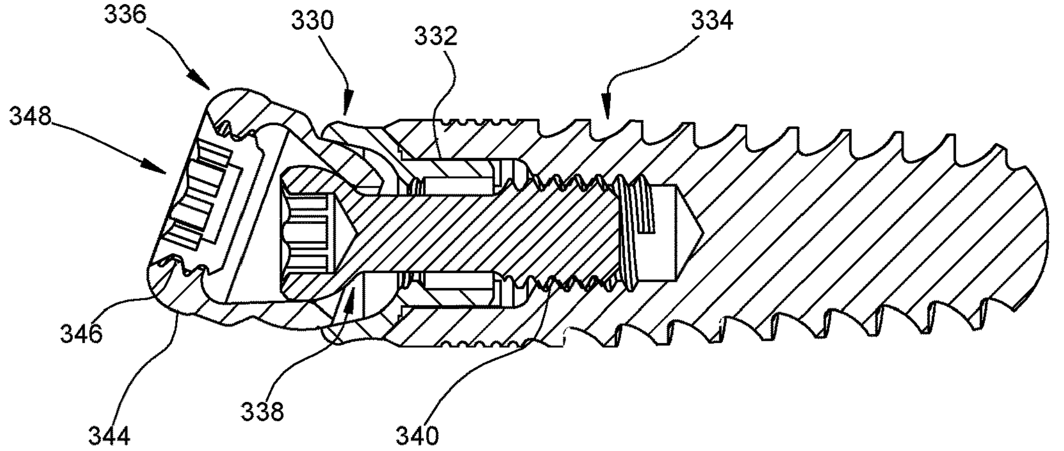

In the embodiment illustrated in FIG. 9B, an abutment base 330 engages an internal anti-rotational feature 332 of an implant 334 and an abutment top 336 is fixed in place using a fixation screw 338 that engages inner threads 340 of the implant 334. The abutment top 336 has a coronal outer feature 344 suitable for a removable overdenture prosthesis and may have optional inner threads 346 to engage supporting components and a cover screw 348 to prevent debris and contamination of the assembly.

Figure 9C:
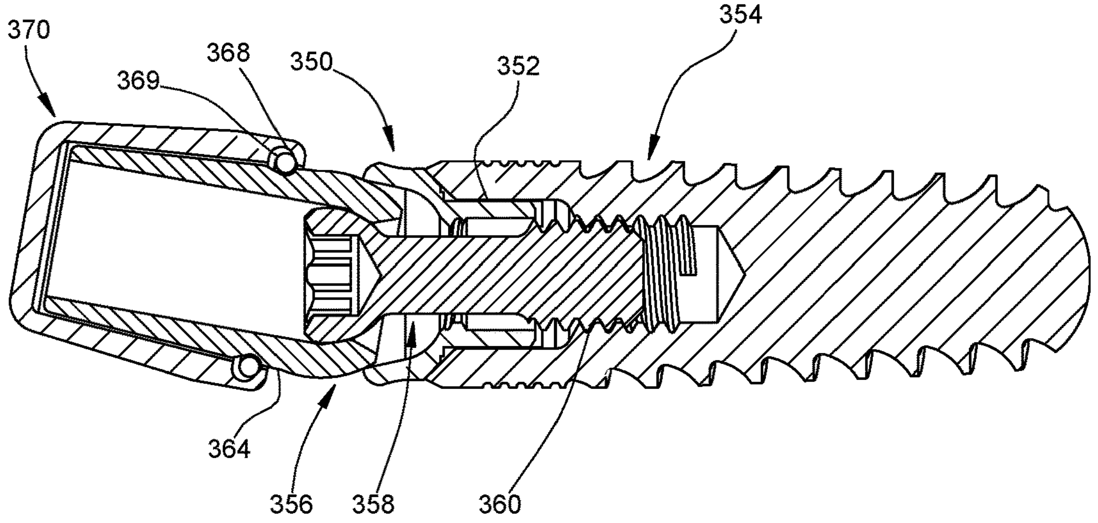

In the embodiment illustrated in FIG. 9C, an abutment base 350 engages an internal anti-rotational feature 352 of an implant 354 and an abutment top 356 that is fixated in place using a fixation screw 358 that engages inner threads 360 of the implant 354. The abutment top 356 has a coronal outer feature 364 suitable for friction or cement retained prosthesis and has an optional snapping groove feature 368 to engage a flexing feature or an o-ring 369 of a supporting component 370. Supporting components include castable cylinders, scan-adapters, impression transfers, overdenture housing/cap pieces, or the like.

Figure 9D:
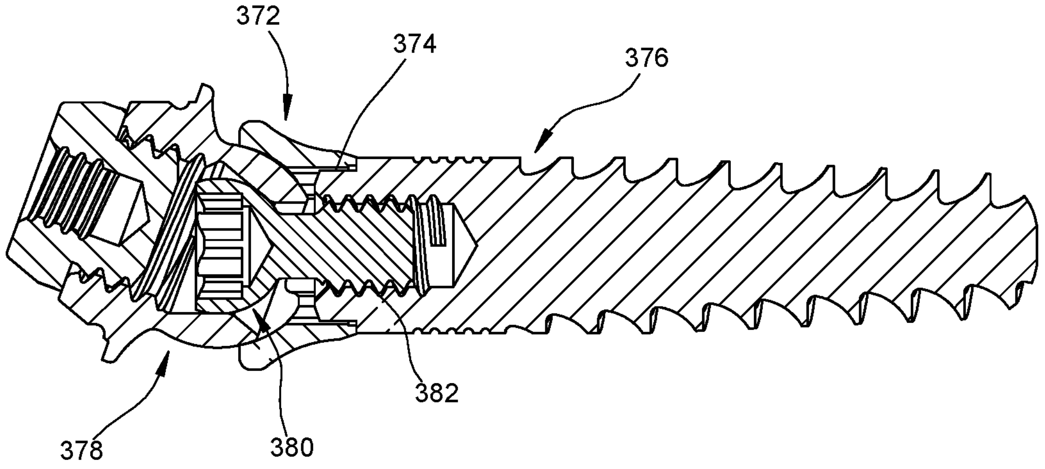

The embodiment illustrated in FIG. 9D includes an abutment base 372 that engages an external anti-rotational feature 374 of an implant 376 and an abutment top 378 that is fixed in place using a fixation screw 380 that engages inner threads 382 of the implant 376.

Figure 9E:
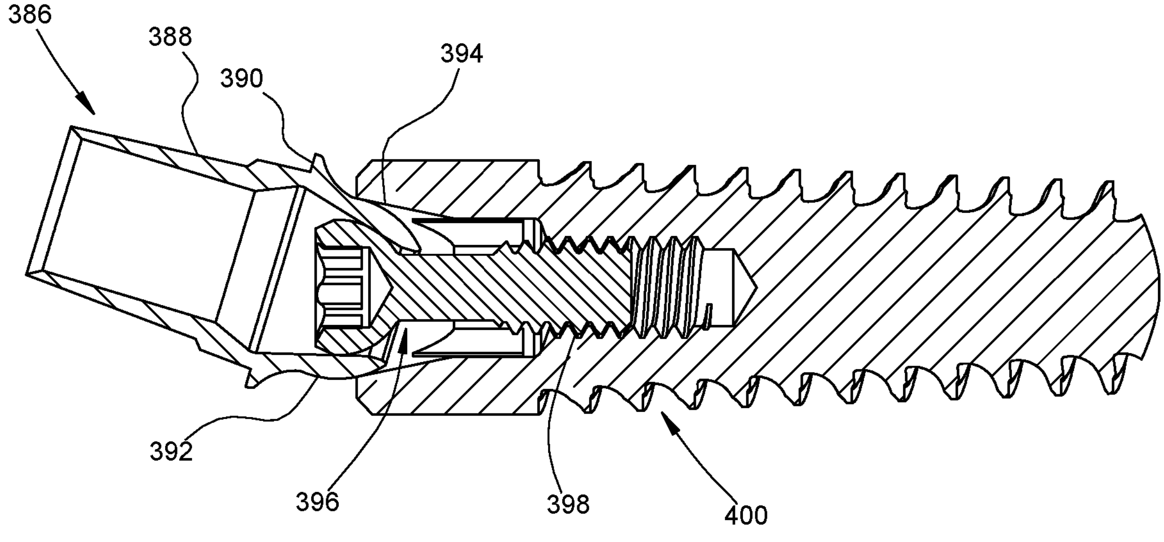
FIG. 9E illustrates an engagement of an abutment top with an implant.

In the embodiment illustrated in FIG. 9E, an abutment top 386 has a coronal region with different optional prosthetic applications for multi-unit or single-unit applications such as a post 388 with a margin 390 and a convex feature 392 at its apical region seating directly onto an implant's 400 beveled or conical inner feature 394 that is fixed in place using a fixation screw 396 that engages inner threads 398 of the implant 400.

The embodiments disclosed herein enable an abutment base to be kept in a patient's mouth throughout the procedure after implant placement to avoid affecting the transmucosal seal. The micromovements caused during replacement of secondary components lead to the disturbance of the connective tissue that is integrated at the implant/abutment junction. Therefore, all other secondary components, such as healing cover screws, scan adaptors, and impression pots, are seated on top of the abutment base. To prevent movement during insertion or removal of secondary components, the abutment base can be threaded into the implant or can have a friction-fit or snap-on connection to the implant.

Figure 10A:
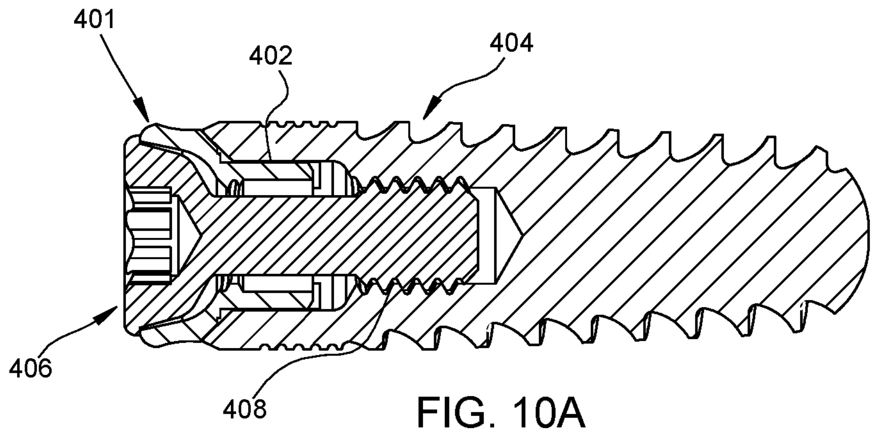
FIGS. 10A, 10B and 10C illustrate abutment bases engaging the internal features of implants and illustrate cover screws seating on top of the abutment bases.
Figure 10B:
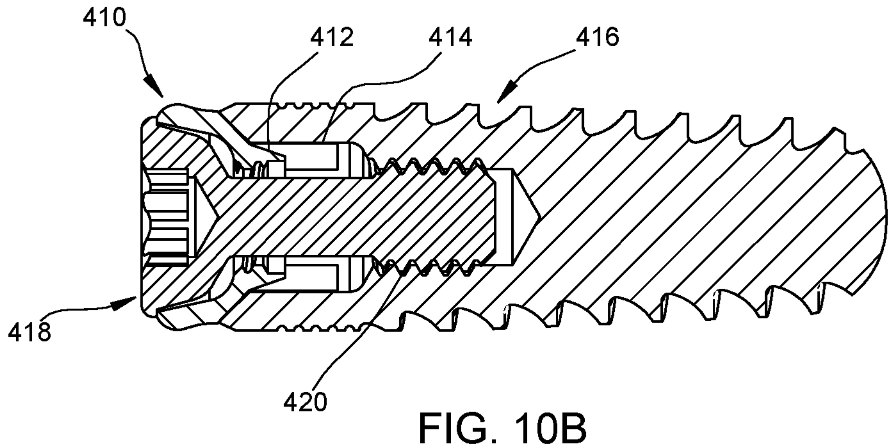
Figure 10C:
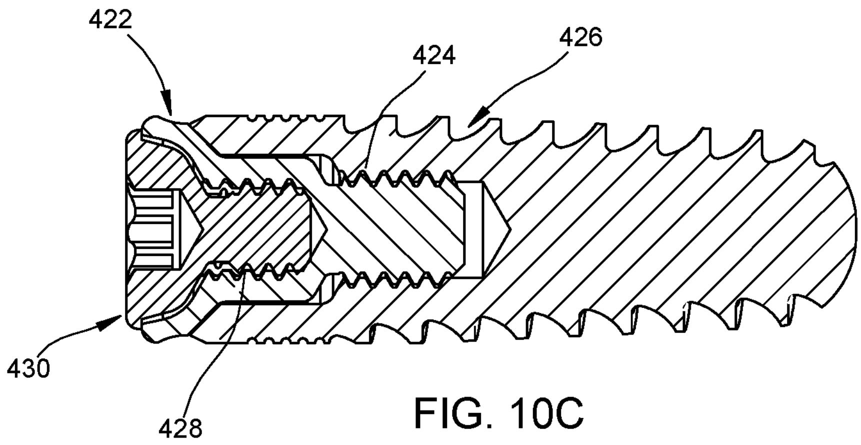

FIG. 10A illustrates an abutment base 401 engaging an internal anti-rotational feature 402 of an implant 404 and a cover screw 406 that engages inner threads 408 of the implant 404. FIG. 10B illustrates an abutment base 410 with a bevel 412 that does not engage an internal anti-rotational feature 414 of an implant 416 and a cover screw 418 that engages inner threads 420 of the implant 416. FIG. 10C illustrates an abutment base 422 that engages inner threads 424 of an implant 426 and has internal threads 428 to receive a cover screw 430.

Figure 11A:
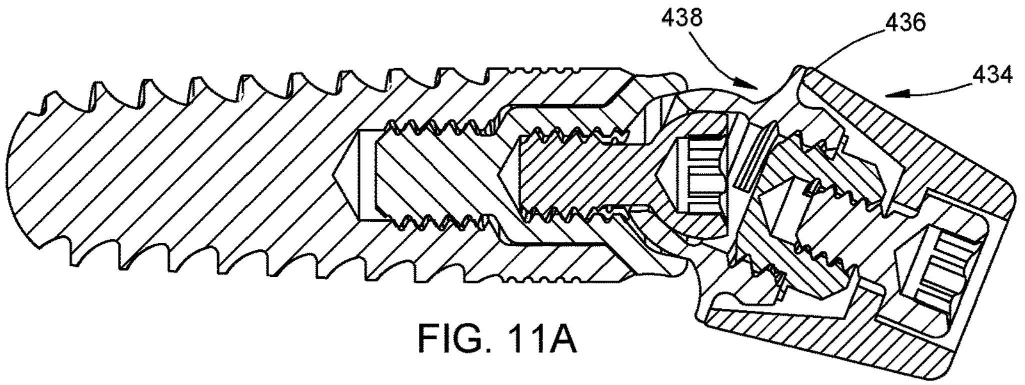
FIGS. 11A, 11B, 11C, 11D, 11E, 11F and 11G illustrate relationships between prostheses and abutments.
Figure 11B:
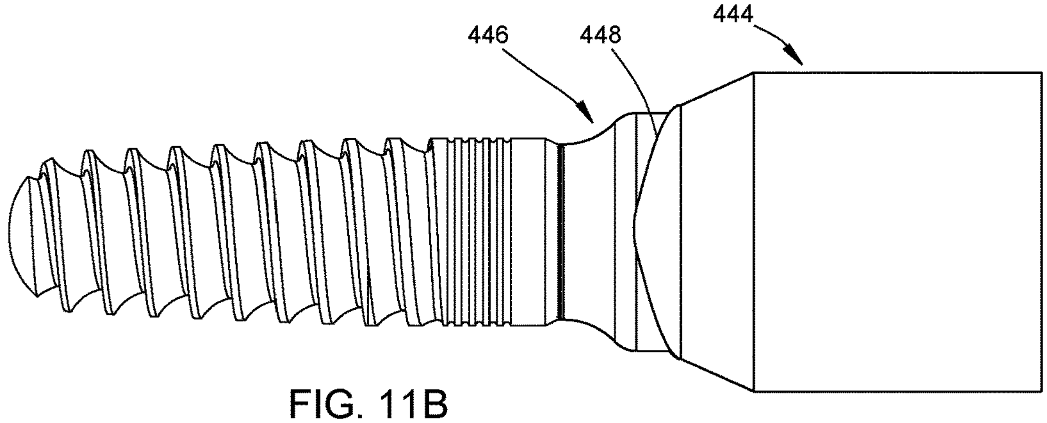
Figure 11C:
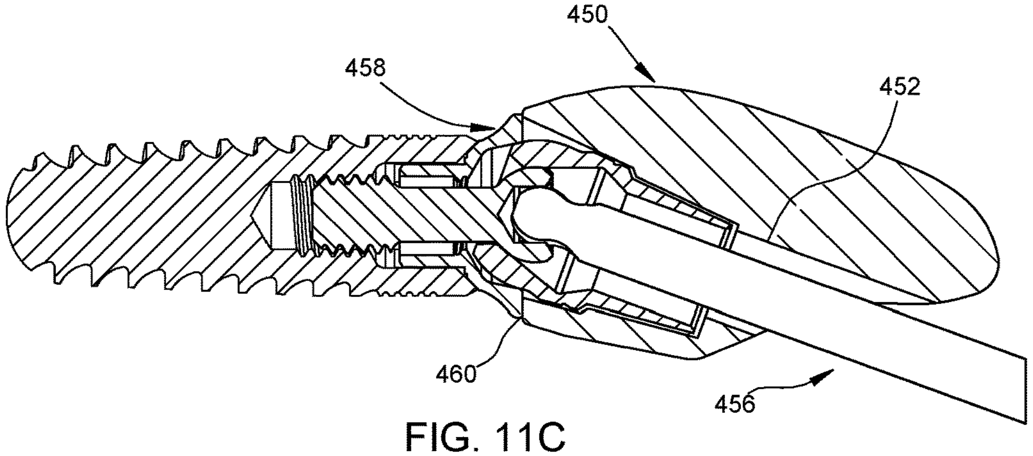
Figure 11D:
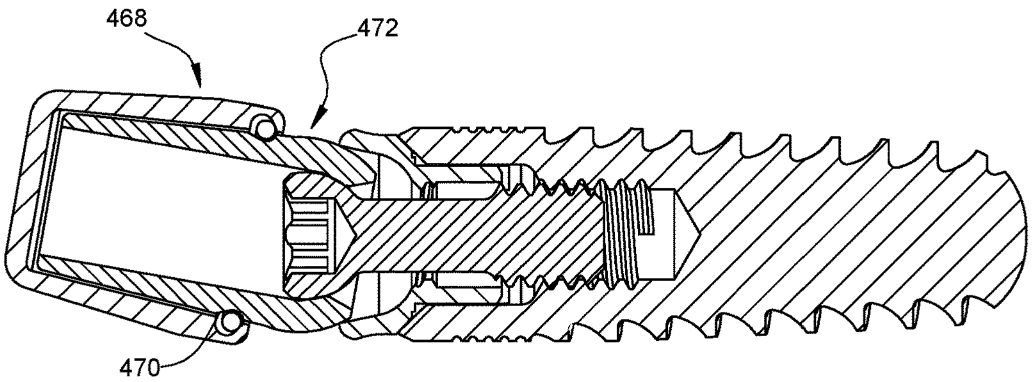

A coping or prosthesis 434 can seat on a top margin 436 of an abutment top 438 as shown in FIG. 11A. A prosthesis 444 can seat on top of an abutment base 446 having a scallop, contour, or natural margin profile 448 as shown in FIG. 11B. A prosthesis 450, having an off-axis cavity 452 to fit a driver 456, can seat on top of an abutment base 458 having a scallop, contour, natural, or straight margin profile 460 as shown in FIG. 11C. A coping or prosthesis 468 can be frictionally engaged or snap-on engaged in a groove 470 of an abutment top 472 without a margin as shown in FIG. 11D.

Figure 11E:
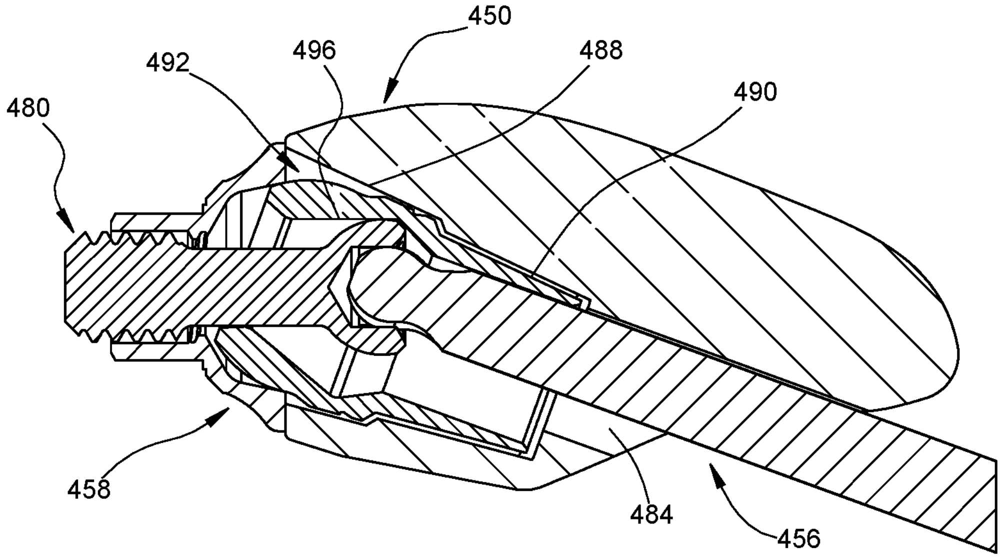

As shown in FIG. 11E for the embodiment of FIG. 11C, a fixation screw 480 can float within the assembly which has the prosthesis 450 having an access cavity 484 in the coronal region to fit the driver 456 and an inner cavity 488 at the apical region to cement a post 490 of an abutment top 492 assembled onto the abutment base 458. The abutment base 458 has an inner cavity 496 to allow for axial movement of the fixation screw 480 while preventing the fixation screw 480 from falling out when the assembly is carried to the application site.

The prosthesis can be fabricated using a digital workflow or a conventional workflow with supporting components such as digital scan adapters or castable cylinders. The design of the prosthesis also allows for the extra-oral cementation of the prosthesis, which can prevent excess cement leftover that can lead to peri-implant complications.

Figure 11F:
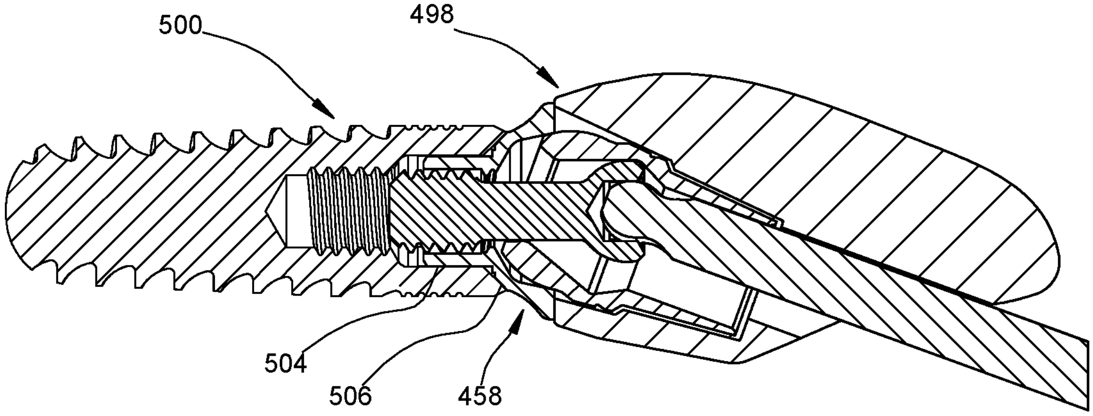
Figure 11G:
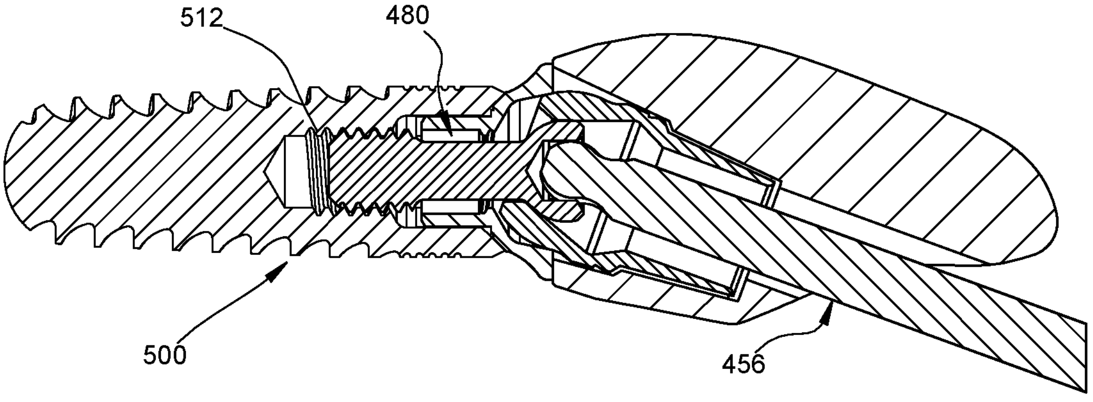

As shown in FIG. 11F for the embodiment of FIG. 11C, an assembly 498 can then be taken to the site to engage an implant 500 by first having the abutment base 458 engage an anti-rotational feature 504 and seat onto an interface 506 of the implant 500. As shown in FIG. 11G for the embodiment of FIG. 11C, the fixation screw 480 is then threaded into threads 512 of the implant 500 via the driver 456.

Figure 12A:
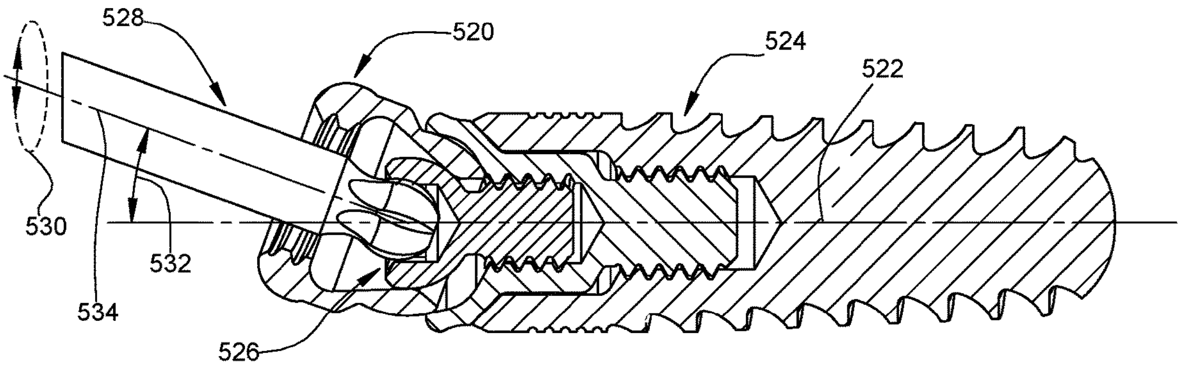
FIGS. 12A and 12B illustrate relationships between multi-unit prostheses and abutments.
Figure 12B:
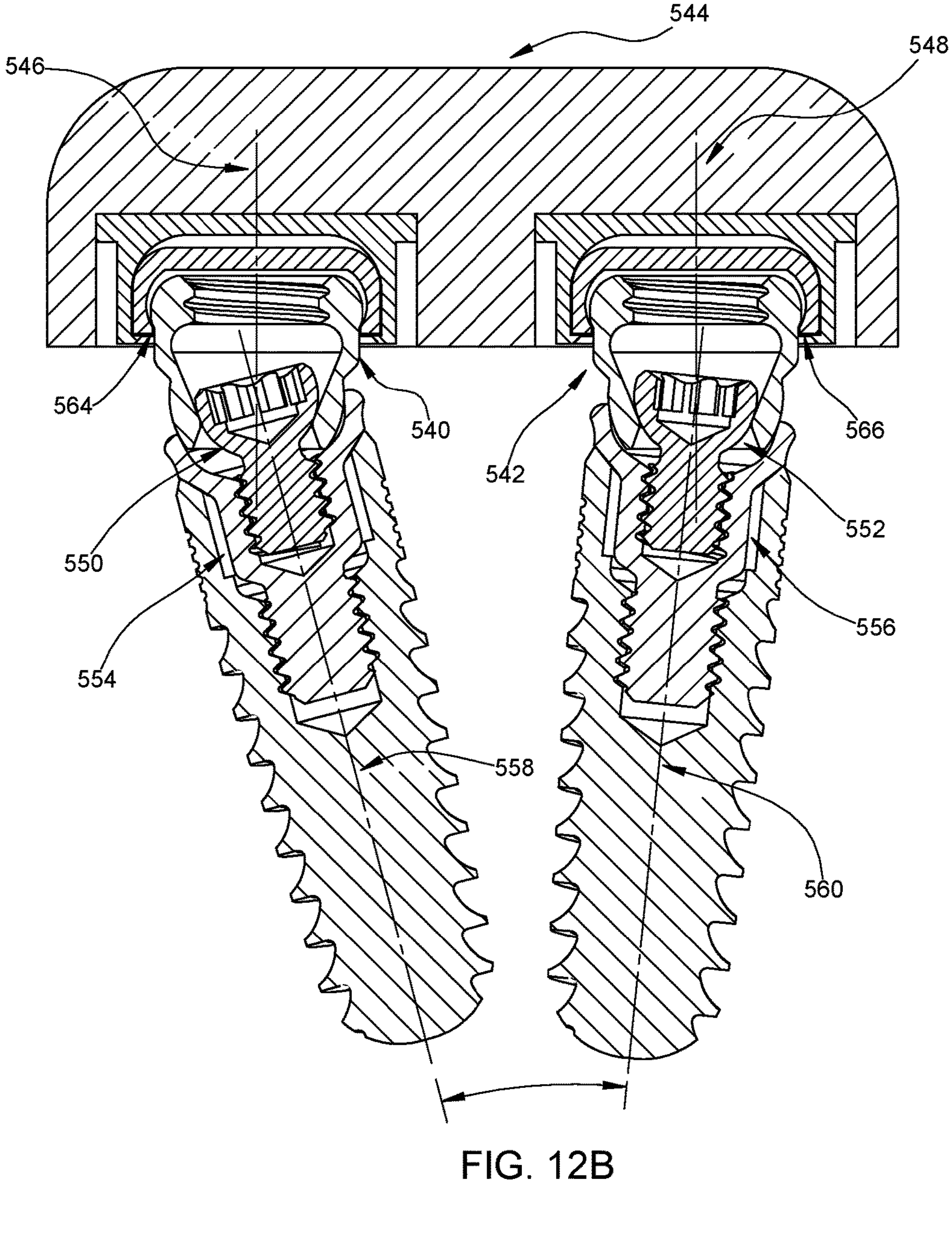

The system also allows for an abutment top 520 to be adjusted from a main axis 522 of a placed implant 524. The abutment top 520 is adjusted by first slightly tightening a fixation screw 526 using a driver 528 while still allowing for abutment top rotation 530 and angulation 532 of an abutment top axis 534 as shown in FIG. 12A. As illustrated in FIG. 12B, the alignment between two or more abutment tops 540 and 542 is then adjusted before assembling a prefabricated temporary or final multi-unit prosthesis 544 onto the two or more abutment tops 540 and 542 and readjusted as needed to ensure an optimum parallelism between axes 546 and 548 before fully tightening fixation screws 550 and 552 into the implants or abutment bases 554 and 556. Axes 558 and 560 are off-axis from axes 546 and 548 thereby preventing damage to the upper structure or flexible liners 564 and 566 as shown in FIG. 12B.

Figure 13A:
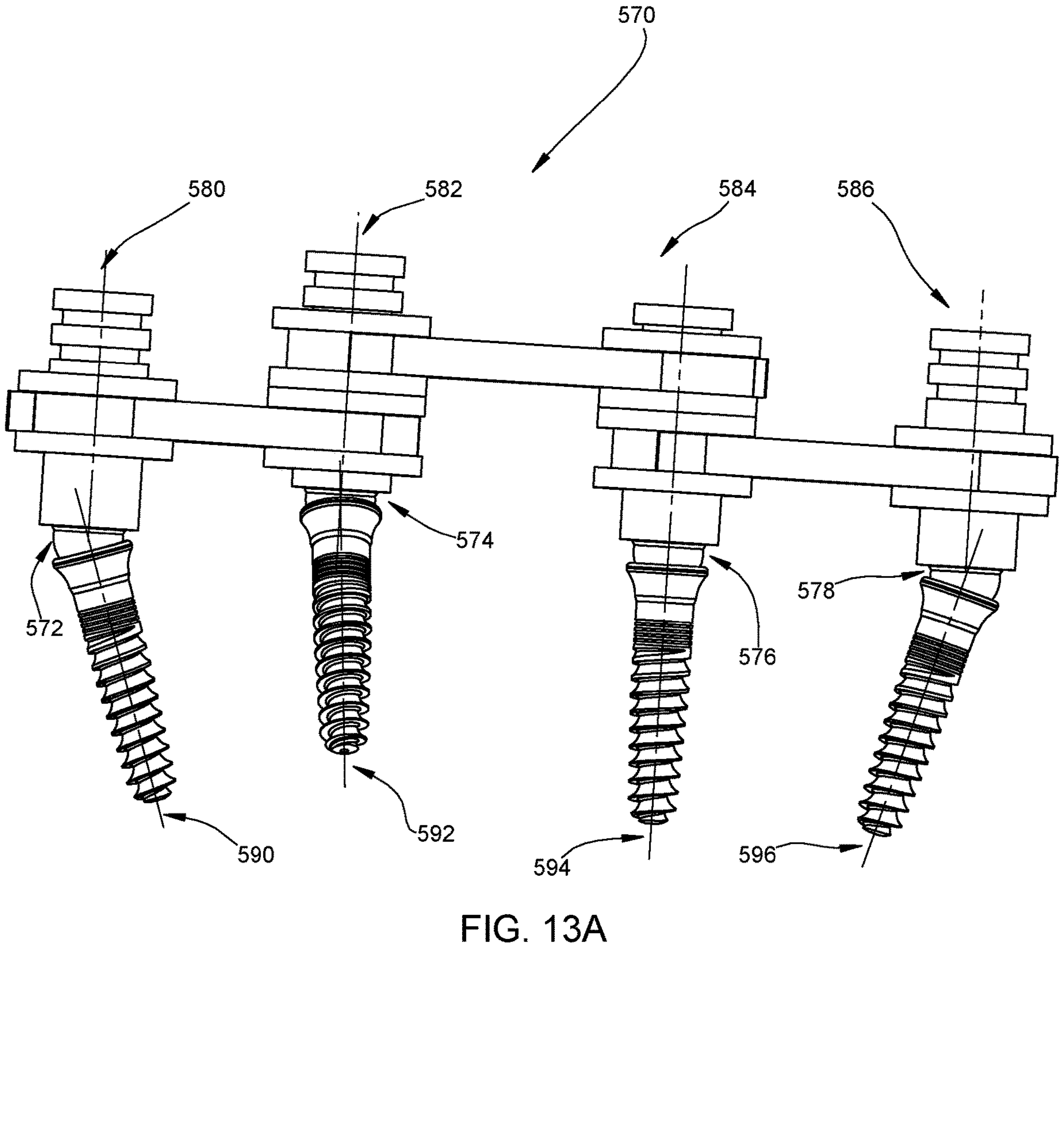
FIGS. 13A, 13B, 13C, 13D, 13E and 13F illustrate paralleling systems for multi-unit applications.

The embodiments disclosed herein also provide a paralleling system 570 to assist in enabling proper alignment between abutment tops 572, 574, 576, and 578 within the assemblies for multi-unit applications. The paralleling system ensures accurate alignment of each abutment top prosthetic interface axis 580, 582, 584, and 586 independent of each implants axis 590, 592, 594, and 596 to guarantee optimum passive fit of a prosthesis as shown in FIG. 13A.

Figure 13B:
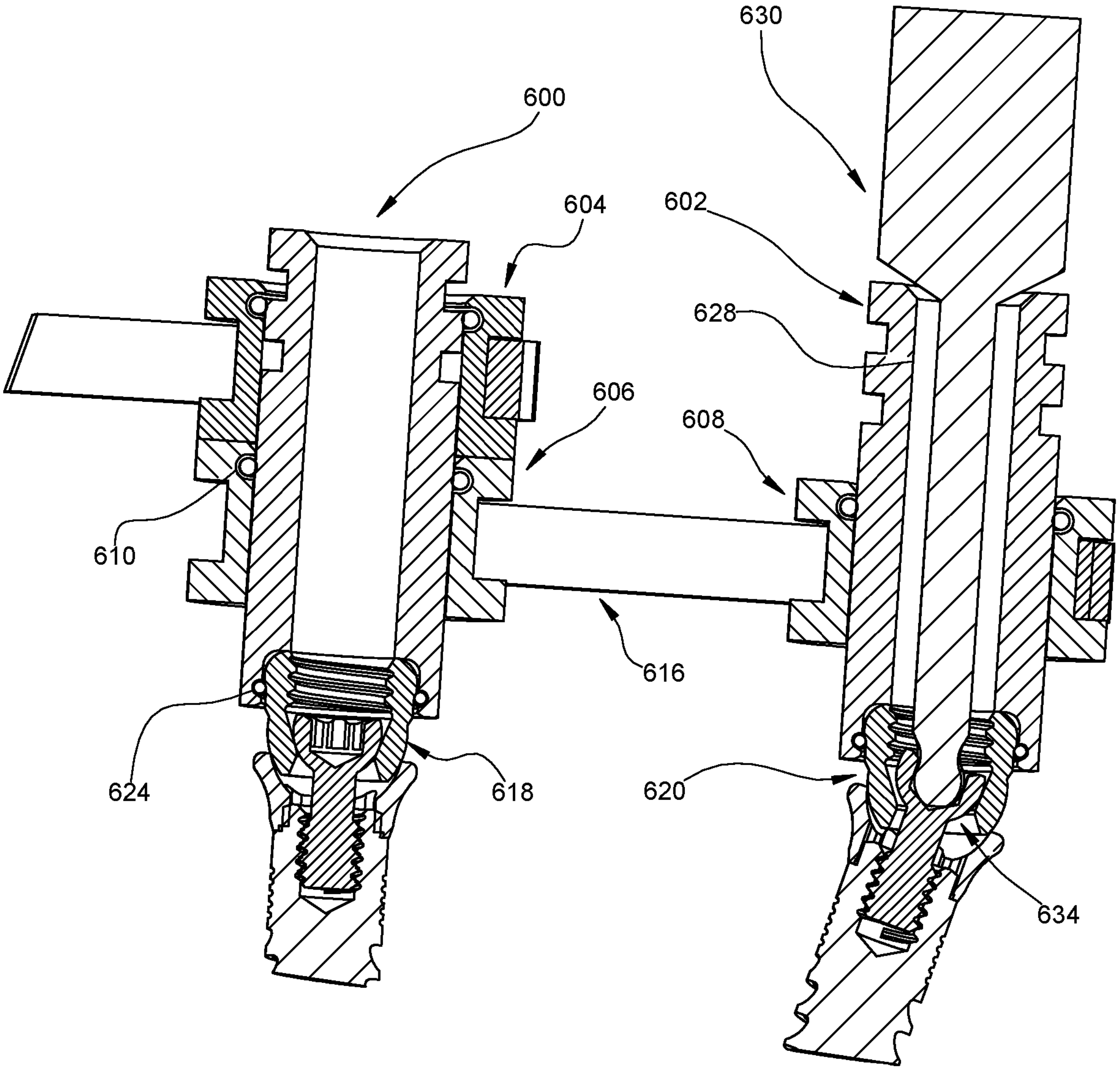

The paralleling system also supports other procedures, such as traditional impressions, digital scanning, and temporary restorations. A paralleling set can also be used as an implant verification jig for several types of abutment systems to ensure the accuracy of the final impression for multi-implant restorations. A user may use the cylinders to visually align the abutment tops interface, or the user can use a paralleling set to further assist in the alignment of multiple units. Cylinders 600 and 602 can be assembled with paralleling tubes 604, 606, and 608 having a snag-fit with a retentive feature or an o-ring 610 that are connected to each other via a bracket 616. This configuration ensures parallelism between abutment tops 618 and 620 which are connected to the cylinders via a retentive element, a snap-on feature, or an o-ring 624 to facilitate carrying the abutment top to the site. The cylinders 600 and 602 have an inner cavity 628 that allow for a screwdriver 630 to engage a fixation screw 634 for its tightening once the alignment of the abutment top is determined as shown in FIG. 13B.

The user can first slightly tighten the screw just enough to allow the abutment top to still rotate until alignment is achieved and then tighten to required torque to prevent movement. The cylinder can then be used as a pick-up impression, digital scanning, or castable coping to assist in the design and fabrication of the prosthesis.

Figure 13C:
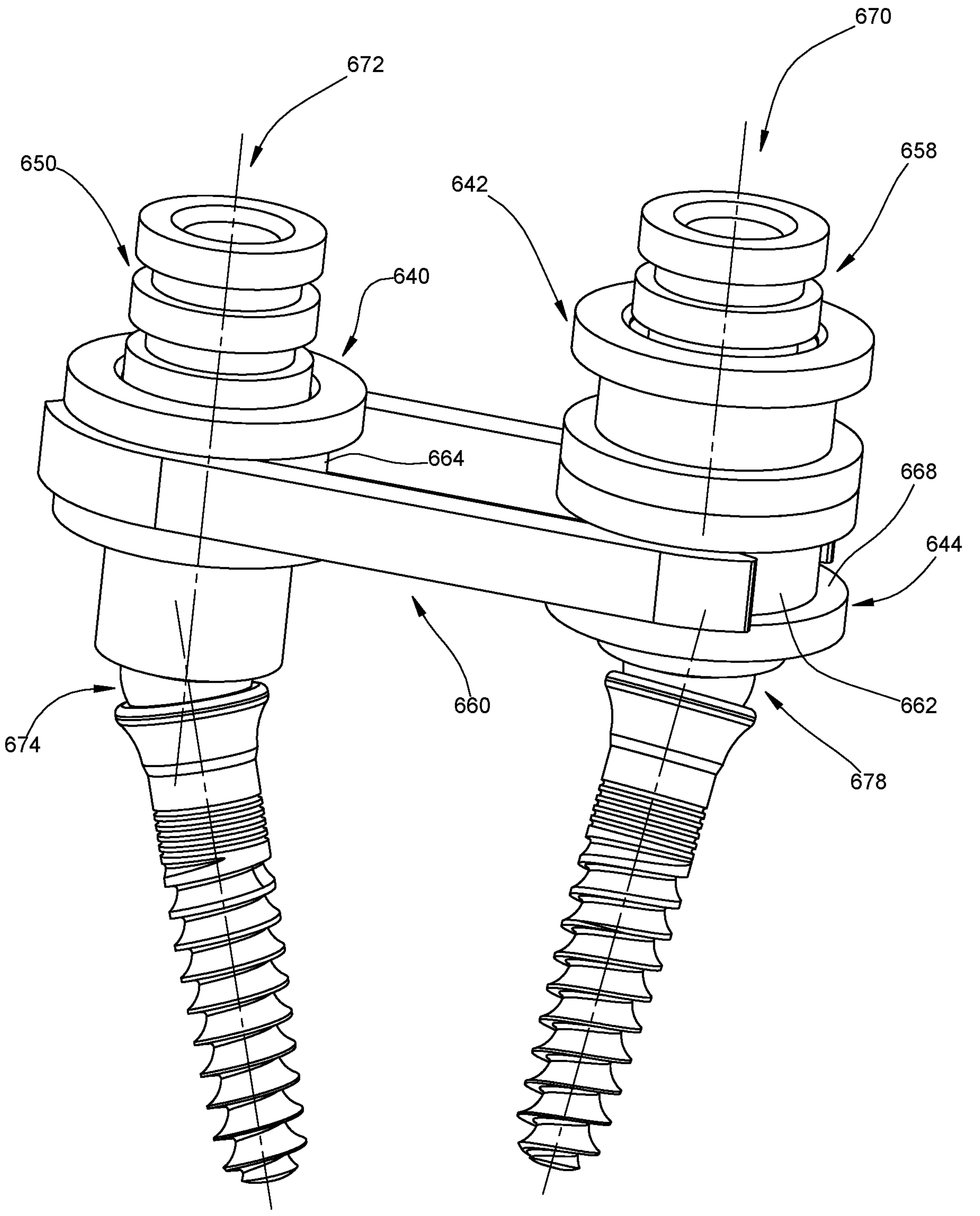

The paralleling set illustrated in FIG. 13C comprises tubes 640, 642, and 644 that slip over cylinders 650 and 658 and brackets 660 that fit snugly in grooves 662 and 664 of the tubes having a flat surface 668 that is perpendicular to axes 670 and 672 of the cylinders 650 and 658 to assist in the alignment of two or more abutment tops 674 and 678.

Figure 13D:
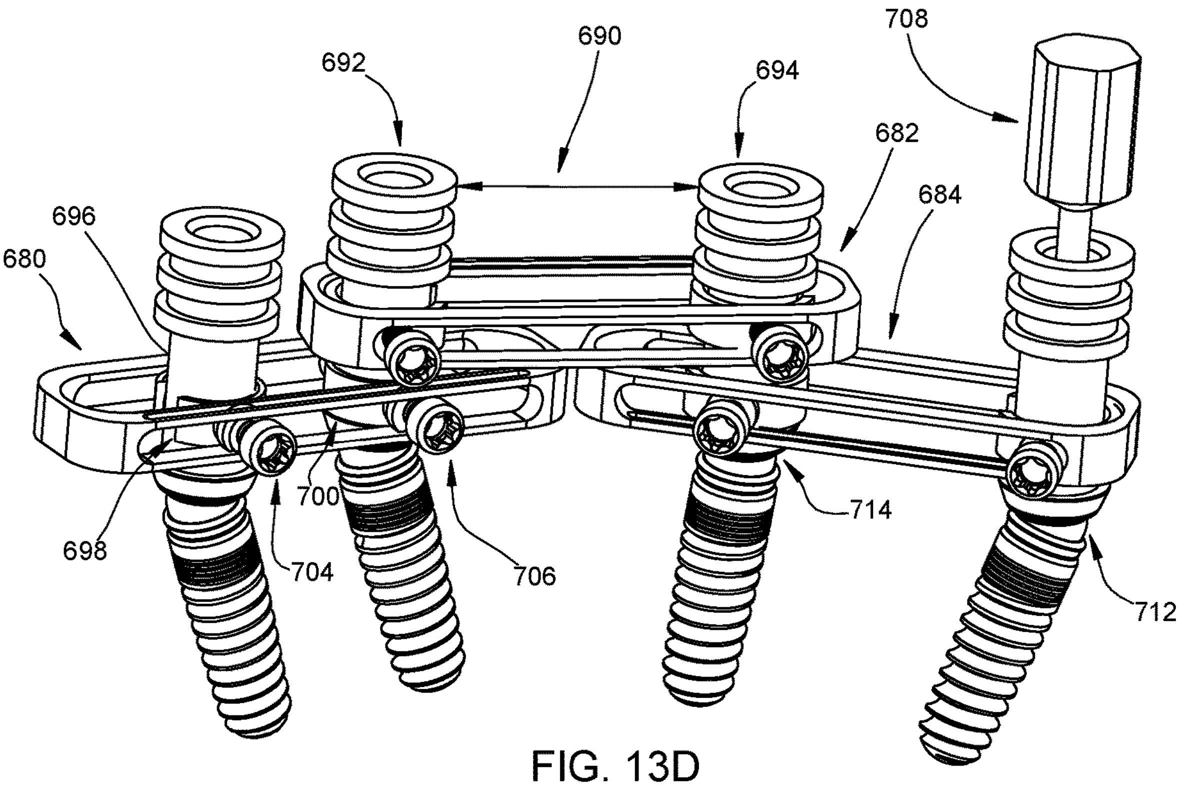

The paralleling set can also comprise brackets 680, 682, and 684 that allow for side-to-side positioning 690 of cylinders 692 and 694 having a mid-section 696 that allows for the vertical adjustment of brackets and optional split-rings 698 and 700 that keep the cylinders aligned to the brackets with retentive elements or screws 704 and 706 that secure the paralleling set while allowing for a driver 708 to tighten tilted abutment tops 712 and 714 in place to ensure their interface alignment as shown in FIG. 13D.

Figure 13E:
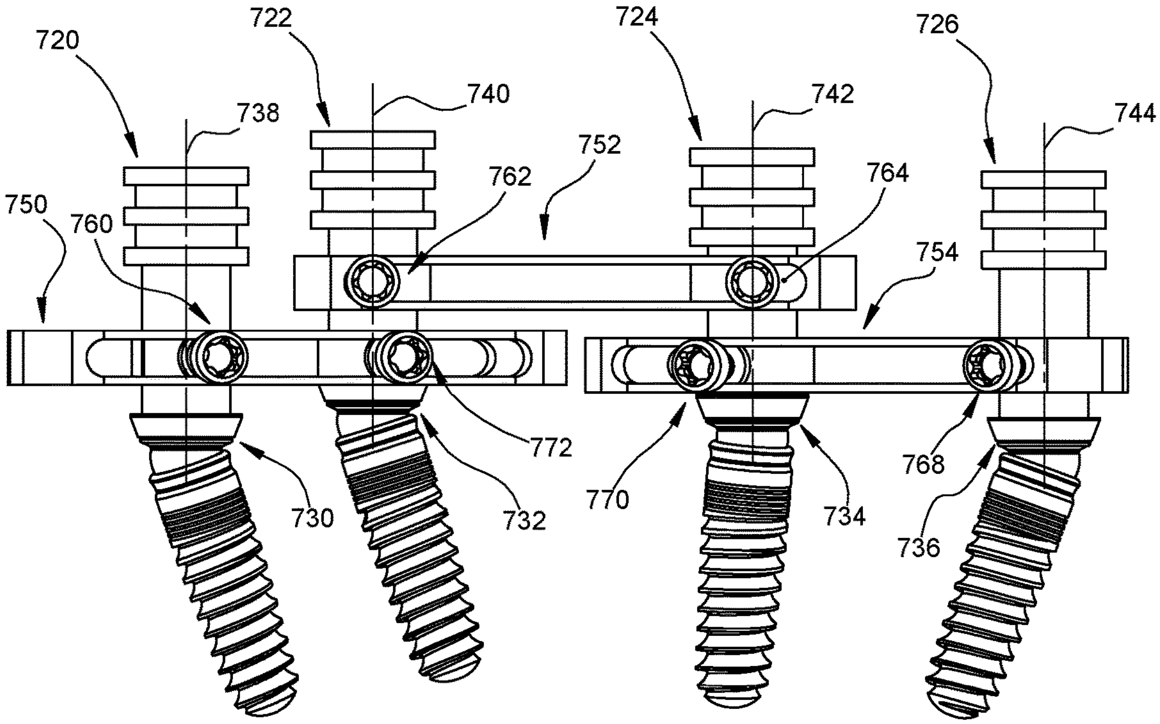

The paralleling set can also comprise one or more cylinders 720, 722, 724, and 726 that are aligned to multi-unit abutment interfaces 730, 732, 734, and 736. The abutment interfaces 730, 732, 734, and 736 include abutment axes 738, 740, 742 and 744. The abutment axes 738, 740, 742, and 744 are positioned parallel to each other using one or more brackets 750, 752 and 754 that connect the cylinders together locking the abutment interfaces 730, 732, 734, and 736 in place via retentive features or screws 760, 762, 764, 768, 770, and 772 as shown in FIG. 13E.

Figure 13F:
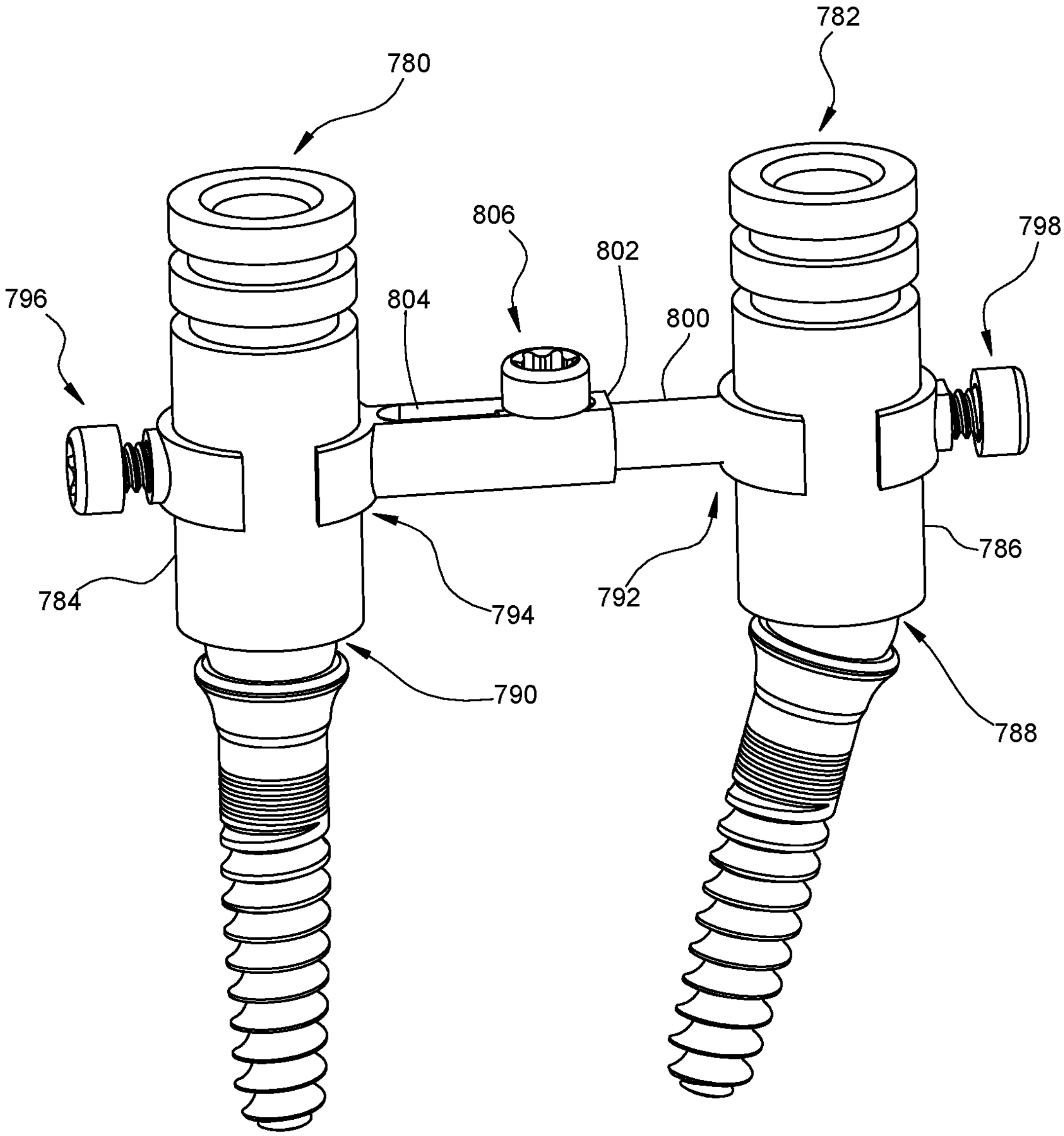

The paralleling set comprises one or more cylinders 780 and 782 having shafts 784 and 786 that are aligned to multi-unit abutment tops 788 and 790 and are connected to each other using two-piece brackets 792 and 794 via retentive feature or screws 796 and 798. Each bracket includes a male extension 800 and a female extension 802 with an opening or a slot 804 that allow for side-to-side adjustments. The male extension 800 and the female extension 802 are locked in place via a retentive feature or a screw 806 as shown in FIG. 13F.

As various changes could be made in the above constructions without departing from the scope of the invention, it is intended that all the matter contained in the above description or shown in the accompanying drawings shall be interpreted as illustrative and not in a limiting sense.

What is claimed is:

1. A dental system comprising:

a lower component having a coronal region with a bevel interface; and an upper component having:

an apical region with a corresponding convex interface:

an inner cavity with a bevel surface, the lower component and the upper component fixed together via a screw with a circular or convex outer surface that seats on the bevel surface of the upper component and remains aligned to the axis of the lower component; and at least one protrusion disposed on the apical region and configured to limit a pivot angle of the upper component when fixed together with the lower component, wherein the upper component is rotatable around an axis of the lower component and pivotable at an angle with respect to the axis, and wherein the upper component comprises internal threads configured to engage a prosthetic supporting component.

2. The dental system as defined in claim 1, wherein the lower component comprises an implant.

3. The dental system as defined in claim 1, wherein the lower component comprises a root post.

4. The dental system as defined in claim 1, wherein the lower component comprises an implant-engaging abutment.

5. The dental system as defined in claim 1, wherein the lower component comprises an abutment having threads for engaging an implant.

6. The dental system as defined in claim 1, wherein the upper component comprises coronal features to support removable overdentures.

7. The dental system as defined in claim 1, wherein the upper component comprises coronal features to support fixed-retained overdentures.

8. The dental system as defined in claim 1, wherein the upper component comprises upper features to support single-unit prosthesis.

9. The dental system as defined in claim 1, wherein the upper component has a margin to support prosthetic component.

10. The dental system as defined in claim 1, wherein the upper component has no margin and has a coronal feature to frictionally retain or snap-on retain a prosthetic component.

11. The dental system as defined in claim 1, wherein the lower component has a margin to support prosthetic component.

12. The dental system as defined in claim 1, wherein the lower component has a scallop, contour, or natural margin.

13. The dental system as defined in claim 1, wherein the lower component and the upper component support conventional and digital prosthetic fabrication workflows.

14. The dental system as defined in claim 1, wherein the upper component has coronal features that are off axis to the axis of the convex interface.

15. The dental system as defined in claim 1, wherein the upper component has coronal features having the same axis as the axis of the convex interface.

16. The dental system as defined in claim 1, wherein the lower component and the upper component are fixed together via the screw with the circular or convex outer surface that seats on the bevel surface of the upper component and engages the threads of an implant.

17. The dental system as defined in claim 1, wherein the lower component and the upper component are fixed together via the screw with the circular or convex outer surface that seats on the bevel surface of the upper component and engages the threads of the lower component.

* * * * *